United States Patent [19]

Zhou et al.

[11] Patent Number: 5,798,753

[45] Date of Patent: Aug. 25, 1998

[54] COLOR FORMAT CONVERSION IN A PARALLEL PROCESSOR

[75] Inventors: Chang-Guo Zhou, Cupertino; Daniel S. Rice, Oakland, both of Calif.

[73] Assignee: Sun Microsystems, Inc., Palo Alto, Calif.

[21] Appl. No.: 398,111

[22] Filed: Mar. 3, 1995

[51] Int. Cl.$^6$ .............................. G06T 1/20; G06F 15/00

[52] U.S. Cl. .................. 345/154; 345/152; 345/153; 345/501; 345/506; 345/186

[58] Field of Search ....................... 345/150, 199, 345/152–154, 186; 348/252; 395/501, 506

[56] References Cited

U.S. PATENT DOCUMENTS

| | | | |
|---|---|---|---|
| 4,547,796 | 10/1985 | Iwase et al. | |
| 4,578,673 | 3/1986 | Yianilos et al. | 345/153 |
| 4,975,768 | 12/1990 | Takaraga | |
| 5,089,882 | 2/1992 | Kaye et al. | |
| 5,109,348 | 4/1992 | Pfeiffer et al. | 345/189 |
| 5,210,705 | 5/1993 | Chauvel et al. | |
| 5,228,126 | 7/1993 | Marianetti, II | 345/154 |
| 5,233,684 | 8/1993 | Ulichney | 345/154 |
| 5,351,074 | 9/1994 | Kadowaki et al. | |
| 5,373,327 | 12/1994 | McGee et al. | |
| 5,416,614 | 5/1995 | Crawford | 345/154 |
| 5,508,741 | 4/1996 | Hieda | 348/252 |
| 5,510,851 | 4/1996 | Foley et al. | 345/197 |

OTHER PUBLICATIONS

Robert B. K. Dewar and Matthew Smosna, *Microprocessors: A Programmer's View*, at 341–375 (McGraw–Hill 1990).

*Primary Examiner*—Mark R. Powell
*Assistant Examiner*—U. Chauhan
*Attorney, Agent, or Firm*—James D. Ivey

[57] ABSTRACT

A pixel of a color video image is converted from one color format having luminance and chrominance signals, e.g., YUV format, to a destination format, e.g., RGB or CMY formats, by forming luminance and chrominance component words which include partitioned words representing various color components of the luminance and chrominance signals. The luminance and chrominance component words are summed using a partitioned addition operation to thereby accumulate the various color components of the luminance and chrominance signals simultaneously and in parallel. Formation of the luminance and chrominance component words is, in some instances, done by a load and store unit of a central processing unit while a graphics execution unit simultaneously sums the luminance and chrominance components using the partitioned addition operation. By using this technique, conversion of pixels of a color motion image from YUV format to a different format, e.g., RGB format, is reduced from approximately 20 instruction cycles per pixel to generally less than 2.5 instruction cycles per pixel. Such a reduction in processing requirements has enabled full real-time rendering, e.g., thirty frames per second, of full-sized, digital NTSC, MPEG-compressed, motion video images using only a central processing unit and appropriately configured computer software. No additional, special-purpose hardware components were needed.

42 Claims, 9 Drawing Sheets

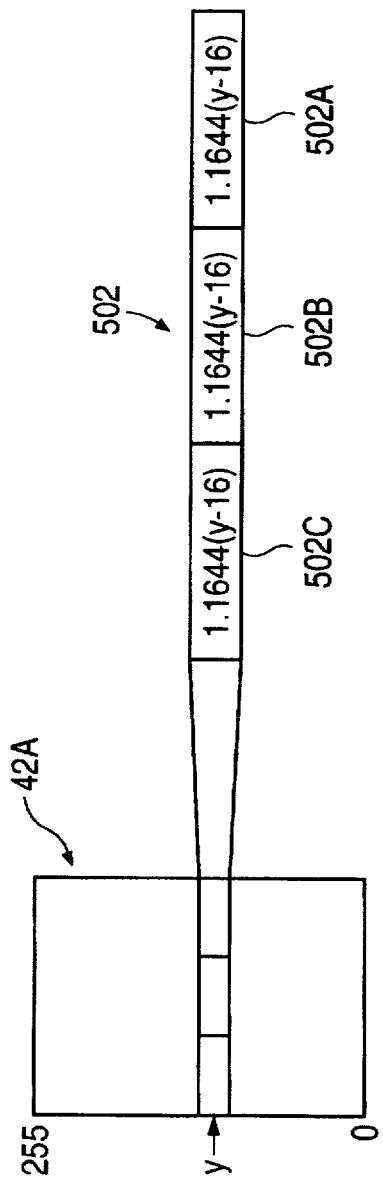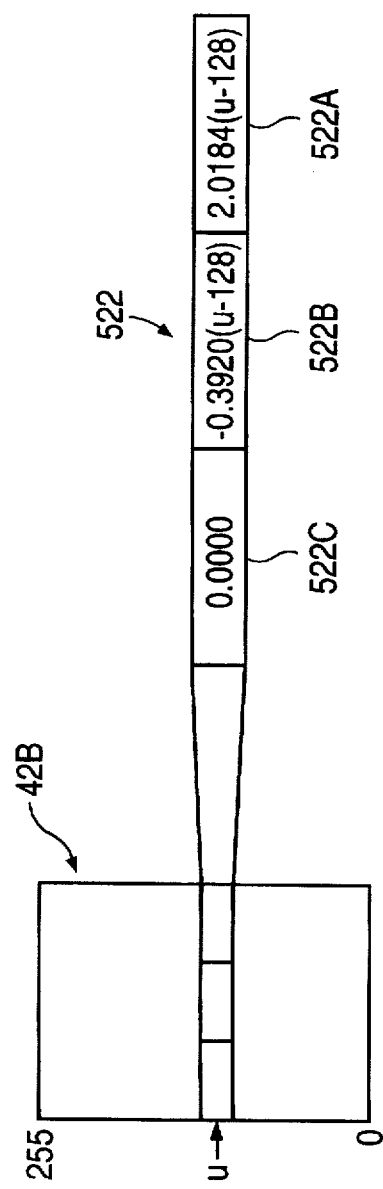
FIG. 5A
FIG. 5B

COLOR FORMAT CONVERSION IN A PARALLEL PROCESSOR

FIELD OF THE INVENTION

The present invention relates to conversion of video signals from one format to another and, in particular, to conversion of video signals from YUV format to a color component or similar format using a parallel processor.

BACKGROUND OF THE INVENTION

Color video images are rendered on televisions and computer display screens using three component colors, typically, red, green, and blue. Video signals representing red, green, and blue components of a pixel are in "RGB" format. Video signals in RGB format typically include the same amount of information for each of the component colors, i.e., for each of red, green, and blue. Other, similar color component formats, e.g., cyan, magenta, and yellow (CMY), are also used.

Video signals are frequently transmitted, e.g., either through frequency-modulated RF signals for reception by conventional televisions or through computer networks for display on a computer display screen, in a YUV format. YUV format takes advantage of the fact that human eyes are more sensitive to luminance information and less sensitive to chrominance information. Video signals in YUV format generally include up to twice as much luminance information as chrominance information. "Y" in YUV generally represents the luminance information and is the only component of a video signal displayed by conventional black-and-white televisions and computer display screens capable of no more than greyscale video displays. "U" and "V" in YUV are chrominance signals and represent two separate color components of the color video signal. A color video signal in YUV format is converted to a color video signal in another format, in particular, RGB format, according to the following well-known equation.

$$\begin{bmatrix} R \\ G \\ B \end{bmatrix} = \begin{bmatrix} 1.1644 & 0.0000 & 1.5966 \\ 1.1644 & -0.3920 & -0.8132 \\ 1.1644 & 2.0184 & 0.0000 \end{bmatrix} \times \begin{bmatrix} Y-16 \\ U-128 \\ V-128 \end{bmatrix} \quad (1)$$

Conversion of video signals from YUV format to other formats, e.g., CMY, is accomplished by other, similar, well-known equations. Conversion of video signals representing pixels in YUV format to video signals in RGB format according to equation (1) requires several multiplication and addition operations per pixel and generally requires approximately 20 instruction cycles of a processor performing such color format conversion.

A digital NTSC television signal generates approximately 10.4 million pixels per second, and to convert the video signals of a digital NTSC television signal from YUV format to RGB format using even the fastest conventional microprocessors requires approximately 200 million instruction cycles per second, i.e., nearly all of the data processing bandwidth of such a microprocessor. Decompression of motion video signals, which have been compressed according to the MPEG compressed video standards for transport through computer networks, for example, includes conversion of video signals from YUV format to a format suitable for display, e.g., RGB format. There are currently two MPEG compressed video standards: (1) ISO/IEC 11172, Information Technology—Coding of Moving Pictures and Associated Audio, November 1991 (generally referred to as "MPEG1"), and (2) ISO/IEC 13818, Information Technology—Generic Coding of Moving Pictures and Associated Audio, April 1994 (generally referred to as "MPEG2"). Full-sized, digital NTSC motion video signals compressed according to MPEG standards represent 30 frames per second and 10.4 million pixels per second. To decompress such motion video signals fast enough to render the video images represented by the video signals in real time, i.e., at the rate at which the video signals were originally recorded, e.g., 30 frames per second, color conversion from YUV format to RGB format or a similar format, in and of itself, requires approximately 20 instruction cycles per pixel and approximately 200 million instruction cycles per second as described above. Using one of the fastest processors currently available, which have clock signal frequencies of approximately 200 MHz, substantially all of the processing bandwidth of the processor is required for color format conversion and virtually no processing bandwidth remains for other components of MPEG signal decompression, e.g., bitstream parsing, variable length decoding, dequantization, inverse DCT transformation, and motion compensation.

As a result, real-time decompression of full-size, digital NTSC motion video signals compressed according to either MPEG standard cannot be done using only general-purpose, conventional microprocessors. Additional hardware is needed for such real-time decompression, adding cost and complexity to systems capable of such MPEG decompression.

SUMMARY OF THE INVENTION

In accordance with the present invention, luminance and chrominance signals are used to form luminance and chrominance component words which include partitioned words representing various color components of the luminance and chrominance signals. The luminance and chrominance component words are summed using a partitioned addition operation to thereby accumulate the various color components of the luminance and chrominance signals simultaneously and in parallel using a number of processing sub-units of a graphics execution unit. Accumulation of color components in parallel substantially reduces the number of instruction cycles required to convert pixels of a color image from YUV format to a different format.

In one embodiment, formation of the luminance and chrominance component words is done by a load and store unit of a central processing unit while the graphics execution unit, in the same central processing unit, simultaneously sums the luminance and chrominance components using the partitioned addition operation. The load and store unit retrieves from one or more tables of precalculated luminance and chrominance component words a luminance component word corresponding to a luminance signal of a pixel and a chrominance component word corresponding to a chrominance signal of the pixel. By forming luminance and chrominance component words of one pixel using the load and store unit while the graphics execution unit sums luminance and component words of another pixel in parallel, the number of instruction cycles required to convert pixels of a color image from YUV format to a different format is substantially reduced further.

By color converting, in accordance with the present invention, conversion of an image from YUV format to a different format, e.g., RGB format, is reduced from approximately 20 instruction cycles per pixel to generally less than 2.5 instruction cycles per pixel. To convert 10.4 million pixels per second of a color motion image stored in an

3

MPEG format, the color conversion from YUV format to RGB format in the rendering of the color motion video image is reduced from 200 million instructions per second to generally less than 25 million instructions per second. Such is easily manageable by currently available processors, even those of unexceptional speed.

In a test implementation of the present invention, which was substantially as described below with respect to Table A, full real-time rendering of MPEG-compressed, full-sized, digital NTSC motion video images was achieved using only a central processing unit and appropriately configured computer software. No additional, special-purpose hardware components were needed.

BRIEF DESCRIPTION OF THE DRAWINGS

FIGS. 5A-C are block diagrams of tables from which luminance and chrominance component data words are retrieved.

DETAILED DESCRIPTION

Figure 1:
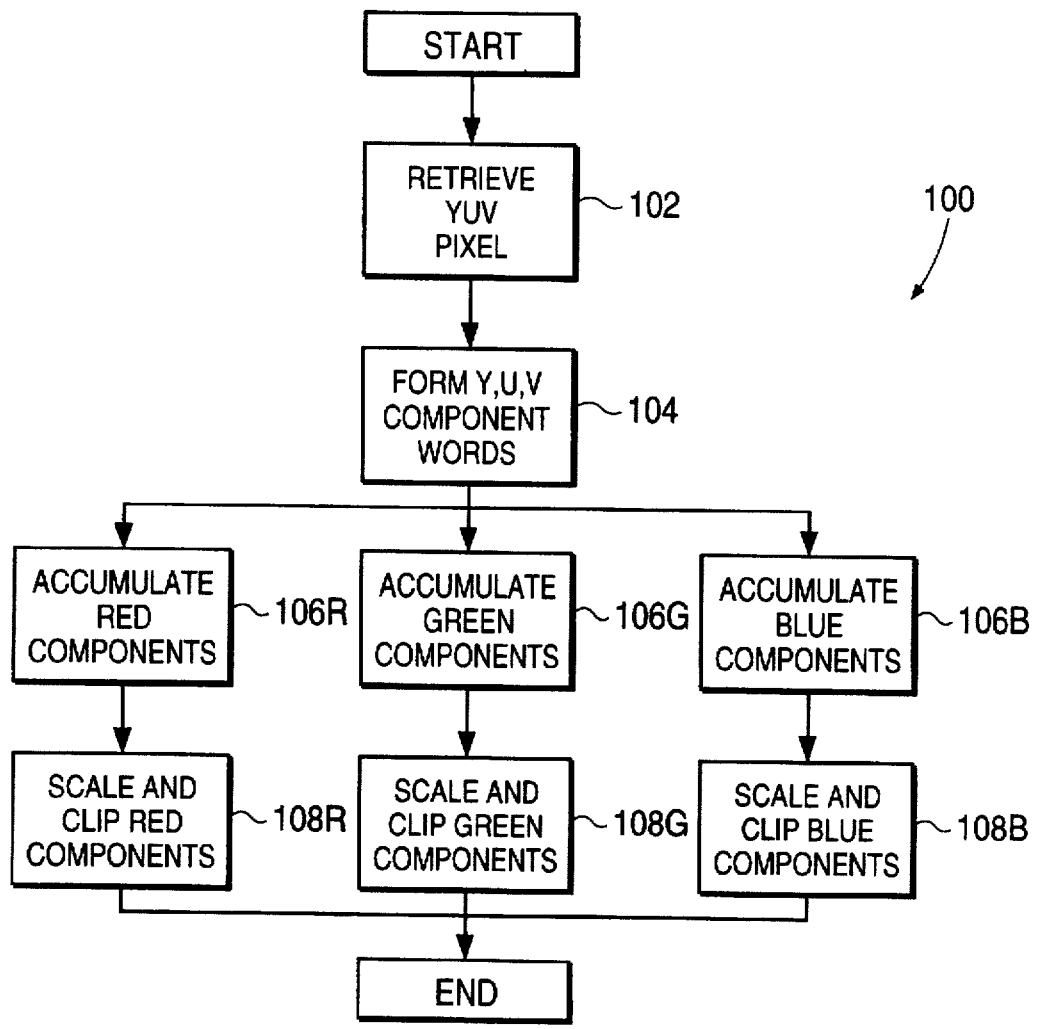
FIG. 1 is a logic flow diagram of a color conversion process in accordance with the present invention.

In accordance with the present invention, parallel circuitry is used to simultaneously process different color components of the luminance and chrominance signals of a pixel of a color image in YUV format in converting the pixel to a different "destination" format. Logic flow diagram 100 (FIG. 1) illustrates the conversion of a color pixel from YUV format to RGB format. The steps of logic flow diagram 100 are performed within a central processing unit of a computer and are equally applicable to conversion of a pixel from YUV format to another destination format, e.g., CMY. The central processing unit is described briefly below and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference.

In step 102, luminance and chrominance signals corresponding to the color pixel are retrieved using conventional techniques. In step 104, luminance and chrominance component words are formed from the retrieved luminance and chrominance signals. A component word is a data word including partitioned segments, each of which represents a component of the represented signal. For example, a luminance component word includes partitioned segments representing respective components of a luminance signal. In the illustrative example shown in FIG. 1, a luminance component word includes partitioned segments representing red, green, and blue components of a luminance signal.

In steps 106R, 106G, and 106B; red, green, and blue components, respectively, of the luminance and chrominance component words are accumulated simultaneously and in parallel to form red, green, and blue components, respectively, of a color component word. A color component word includes partitioned segments representing color components of a color pixel, e.g., red, green, and blue components of a color pixel in RGB format. From steps 106G, 106G, and 106B, processing transfers in parallel to steps 108R, 108G, and 108B, respectively, in which each partitioned segment representing a color component of the color pixel is scaled and clipping so as to be in the destination format. For example, red, green, and blue components of the color component word are scaled and clipped into a commonly-used 8-bit, unsigned integer RGB format in steps 108R, 108G, and 108B, respectively.

Equation (1) above is re-written as follows to better illustrate processing according to logic flow diagram 100.

$$\begin{bmatrix} R \\ G \\ B \end{bmatrix} = \begin{bmatrix} 1.1644 \\ 1.1644 \\ 1.1644 \end{bmatrix} \times (Y - 16) + \begin{bmatrix} 0.0000 \\ -0.3920 \\ 2.0184 \end{bmatrix} \times (U - 128) + \begin{bmatrix} 1.5966 \\ -0.8132 \\ 0.0000 \end{bmatrix} \times (V - 128) \qquad (2)$$

Figure 2:
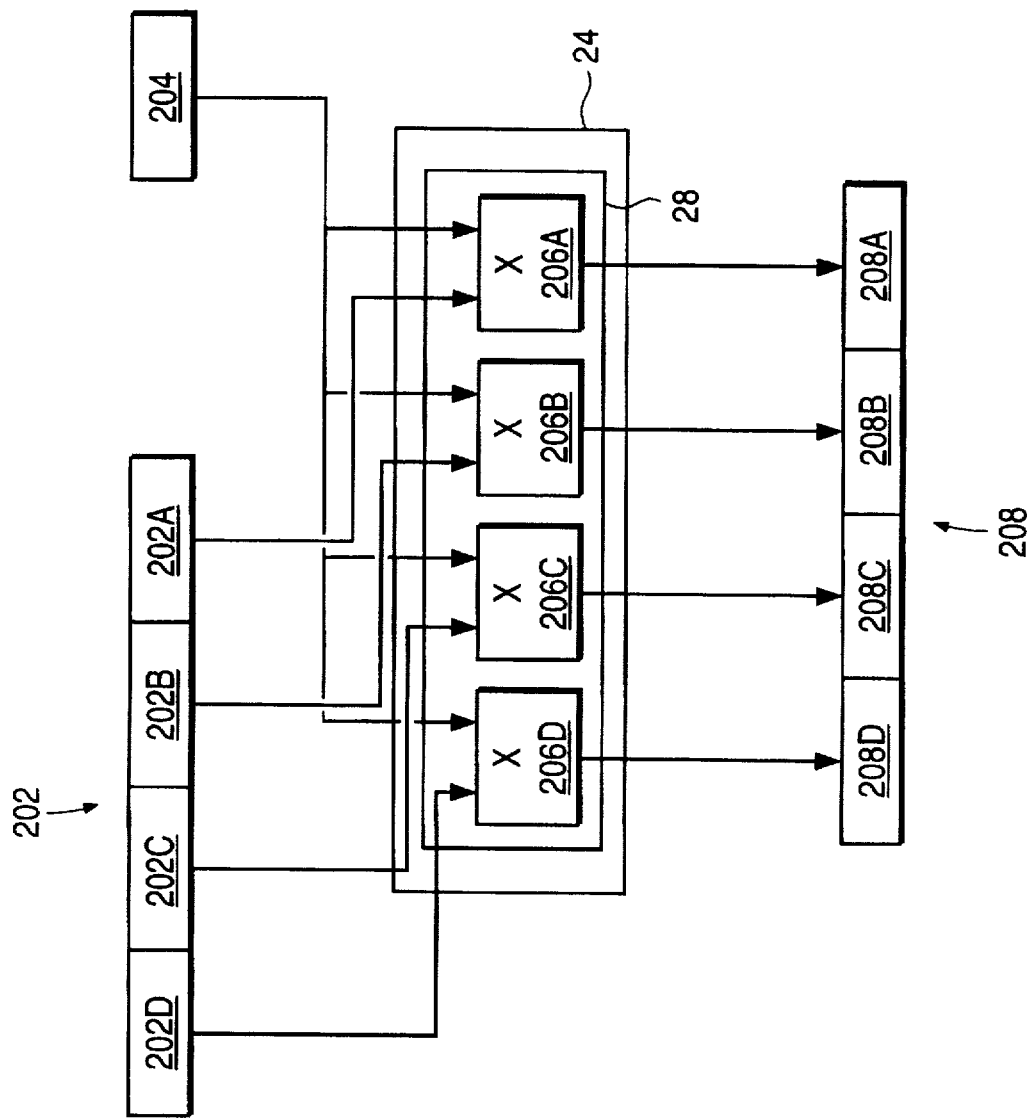
FIG. 2 is a block diagram illustrating a partitioned multiplication operation to form luminance and chrominance component words in accordance with the present invention.

FIG. 2 illustrates the processing of color components of a luminance signal, for example, of a color image pixel in YUV format. A register 202 is partitioned into a number of segments. In one embodiment, register 202 is 64 bits in length and is partitioned into four (4) 16-bit, fixed point segments 202A–D. A coefficient corresponding to red, green, and blue components of the luminance signal are stored in segments 202C, 202B, and 202A, respectively, of register 202. From equation (2) above, the red, green, and blue coefficients of the luminance signal each have a value of approximately 1.1644.

Adjusted luminance data is stored in a register 204. In one embodiment, the adjusted luminance data is represented by an 8-bit, unsigned integer. In another embodiment, the adjusted luminance data is represent by a 16-bit, fixed point number. The adjusted luminance data has a value equal to sixteen (16) less than the value of the luminance signal, represented as data having a value between 0 and 255, as shown in equation (2) above.

Each of segments 202A–D is coupled to an input of a respective one of processing sub-units 206A–D. Processing sub-units 206A–D are included in a graphics execution unit 28 of the central processing unit 24, all of which are described below in greater detail with respect to FIG. 6 and in the '572 application. Register 204 is coupled to a respective input of each of processing sub-units 206A–D, which operate in a multiplication mode simultaneously and in parallel to multiply data stored in register 204 by data stored in segments 202A–D, respectively, of register 202 in a "partitioned multiplication operation". The results of such multiplication are stored in respective partitioned segments 208A–D of a register 208, which are coupled to outputs of processing sub-units 206A–D, respectively. Register 208 is partitioned as described above with respect to register 202.

By storing luminance color component coefficients in segments 202A–C and adjusted luminance data in register 204 and operating processing sub-units 206A–D for one instruction cycle in the multiplication mode, data representing three color components of the luminance signal are produced by processing sub-units 206A–C and are stored in segments 208A–C of register 208. For example, to convert a color pixel in YUV format to a color pixel in RGB format, red, green and blue component coefficients from equation (2) above are stored in segments 202C, 202B, and 202A, respectively. Operation of processing sub-units 206C, 206B, and 206A for one instruction cycle in multiplication mode produces red, green and blue components, respectively, of the luminance signal.

Color components of the two chrominance signals of a color pixel in YUV format are derived in an analogous manner. Red, green, and blue components of a U chrominance signal are derived by (1) storing red, green, and blue component coefficients of the U chrominance signal in segments 202C, 202B, and 202A, respectively, (2) storing in register 204 adjusted U chrominance data, and (3) operating processing sub-units 206A–D in the multiplication mode for one instruction cycle. As shown in equation (2) above, the red, green, and blue component coefficients for the U chrominance signal are approximately 0.0000, −0.3920, and 2.0184, respectively. In addition, the adjusted U chrominance data has a value equal to 128 less than the value of the U chrominance signal represented as data having a value between 0 and 255.

Red, green, and blue components of the V chrominance signal are derived by (1) storing red, green, and blue component coefficients of the V chrominance signal in segments 202C, 202B, and 202A, respectively, (2) storing in register 204 adjusted V chrominance data, and (3) operating processing sub-units 206A–D in the multiplication mode for one instruction cycle. As shown in equation (2) above, the red, green, and blue component coefficients for the V chrominance signal are approximately 1.5966, −0.8132, and 0.0000, respectively. In addition, the adjusted V chrominance data has a value equal to 128 less than the value of the V chrominance signal represented as data having a value between 0 and 255.

Once the various color components of the luminance, U chrominance, and V chrominance signals are derived and stored in corresponding segments of luminance, U chrominance, and V chrominance component words, the component words are accumulated to form a color component word. For example, to form a red component of a color pixel, the red components of the luminance, U chrominance, and V chrominance signals are summed. Summing of the luminance, U chrominance, and V chrominance component words is accomplished in the same graphics execution unit of the central processing unit described briefly above and more completely below and in the '572 application.

Figure 3:
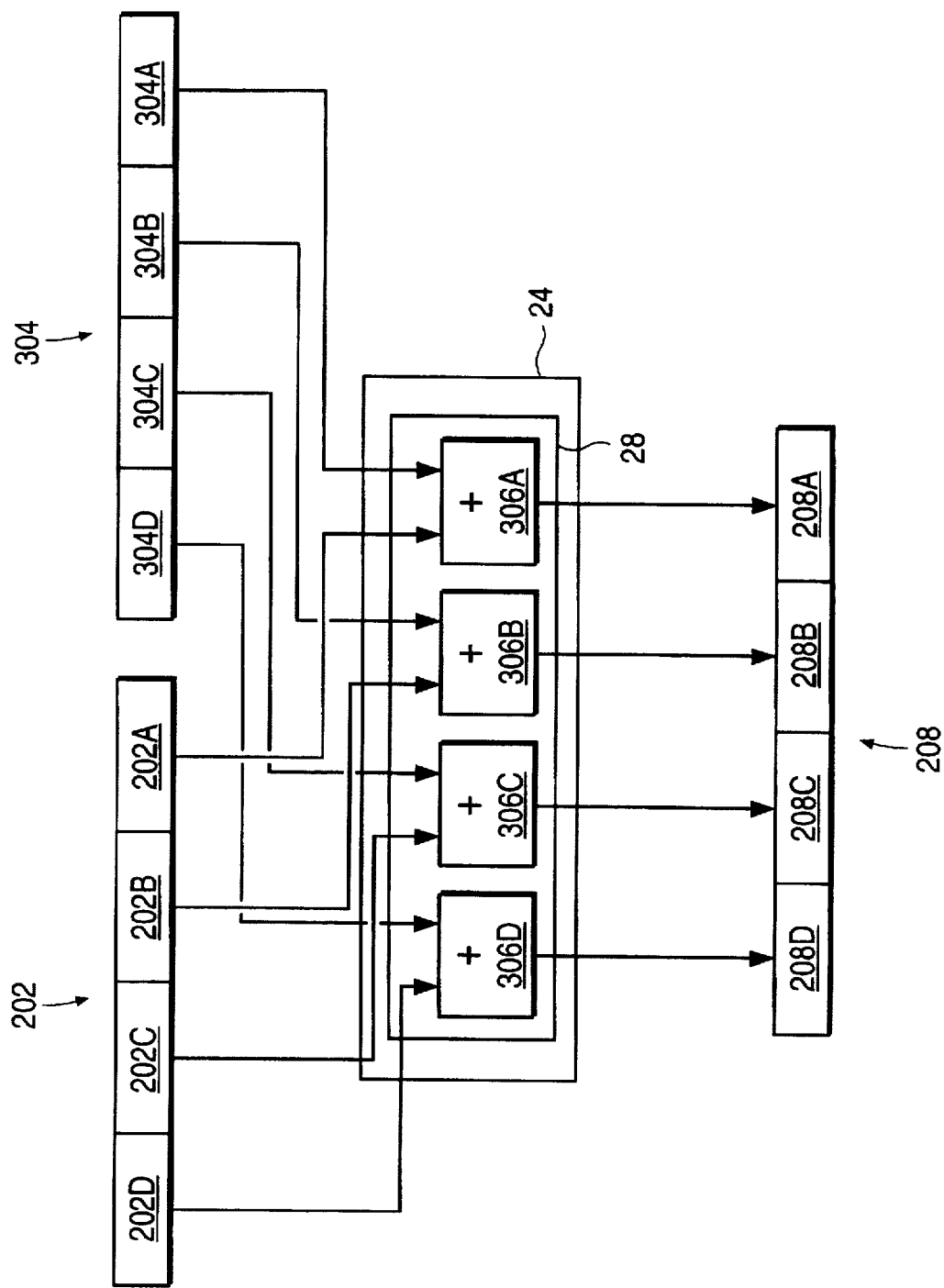
FIG. 3 is a block diagram illustrating a partitioned addition operation to form color component words in accordance with the present invention.

FIG. 3 shows substantially the same circuitry shown in FIG. 2 with the circuitry configured slightly differently in FIG. 3. Register 304 is partitioned into four (4) 16-bit fixed point registers 304A–D, each of which is coupled to an input of a respective one of processing sub-units 306A–D. Processing sub-units 306A–D are included in the graphics execution unit described briefly above and more completely below and operate in an addition mode to execute a "partitioned addition operation." In the partitioned addition operation, processing sub-units 306A–D produce and store in segments 208A–D, respectively, of register 208 data representing the arithmetic sums of data stored in segments 202A–D, respectively, and segments 304A–D, respectively. A composite chrominance component word is formed by (1) storing in register 202 the U chrominance component word, (2) storing in register 304 the V chrominance component word, and (3) operating processing sub-units 306A–D in the addition mode for one instruction cycle. The result is red, green, and blue components of a composite chrominance component word stored in segments 208C, 208B, and 208A, respectively, of register 208.

The composite chrominance component word, as represented in register 208, is useful because, in the standard 4:2:0 YUV format, four pixels are represented by four separate luminance signals and only one U chrominance signal and only one V chrominance signal. The composite chrominance component word can therefore be used in conversion of four separate pixels from YUV 4:2:0 format to RGB format or some similar destination format, e.g., CMY. Consequently, to derive the composite chrominance component word for four (4) pixels of a color image requires two (2) partitioned multiplication operations as described above with respect to FIG. 2, i.e., one for the U chrominance signal and one for the V chrominance signal, and one (1) partitioned addition operation as described above with respect to FIG. 3.

Red, green, and blue components of the color pixel in RGB format are derived by (1) storing the luminance component word in register 202, (2) storing the composite chrominance component word in register 304, and (3) operating processing sub-units 306A–D in the addition mode for one instruction cycle. As a result, red, green, and blue components of a color component word are produced and stored as 16-bit fixed point data in segments 208C, 208B, and 208A, respectively, of register 208. Thus, to form color component words for four (4) pixels of a color image requires, in addition to the operations required to derive the composite chrominance component word as described above, four (4) partitioned multiplication operations to form four (4) respective luminance component words and four (4) partitioned addition operations to form four (4) respective color component words from the four respective luminance component words and a single composite chrominance component word. In total, six (6) partitioned multiplication operations and five (5) partitioned addition operations are required to form four (4) color component words representing four (4) respective pixels of a color image in the destination format.

Generally, component color information of a color pixel is stored in 8-bit, unsigned integer format. Conversion of three 16-bit fixed point color components of a pixel to three 8-bit unsigned integer color components of a pixel typically requires three multiplications and six comparisons. In general, a 16-bit fixed point number is converted to an 8-bit unsigned integer by multiplying the fixed point number by a scaling factor which scales such a fixed point number generally to a number in the range of 0 to 255. This scaling sometimes produces a number which is either less than zero or greater than 255. Each of these contingencies must be recognized by way of a comparison and the number as scaled is replaced with a zero if the number as scaled is less than zero or with 255 if the number as scaled is greater than 255. This latter comparison and replacement scheme is generally referred to as "clipping." The graphics processor described briefly above and more completely below scales and clips four (4) 16-bit fixed point numbers into four (4) 8-bit unsigned integers in a single instruction cycle.

With respect to scaling and clipping the color components of the color component word formed as described above with respect to FIG. 3, the red, green, and blue components of the color component word are stored in segments 202C, 202B, and 202A of register 202. In a packing mode, processing sub-units 406A–D, which are included in the graphics execution unit described briefly above and more completely below, scale and clip data from each of segments 202A–D in a "partitioned packing operation." In the partitioned packing operation, processing sub-units 406A–D scale 16-bit fixed point data of segments 202A–D, respectively, according to a scale factor stored in scale factor register 52, which is described more completely in the '572 application and which is coupled to respective inputs of processing sub-units 206A–D. Also in the packing mode, processing sub-units 206A–D clip the scaled data to the range of values 0–255. The scaling and clipping process is performed by processing sub-units 406A–D in a single instruction cycle and is described more completely in the '572 application with respect to FIG. 8b thereof, and that discussion is incorporated herein by reference. The results of the scaling and clipping of processing sub-units 406A–D are stored in 8-bit segments 408A–D, respectively, of register 408. Thus, 8-bit unsigned integers representing the red, green, and blue components of the pixel of the color image are stored in segments 408C, 408B, and 408A, respectively, of register 408.

As described above, six (6) partitioned multiplication operations and five (5) partitioned addition operations are required to form four (4) color component words representing four (4) respective pixels of a color image in 4:2:0 YUV format. To scale and clip those four (4) color component words to form 8-bit, unsigned integer representation of the color components of the four (4) respective pixels requires four (4) respective partitioned packing operations.

Figure 5C:
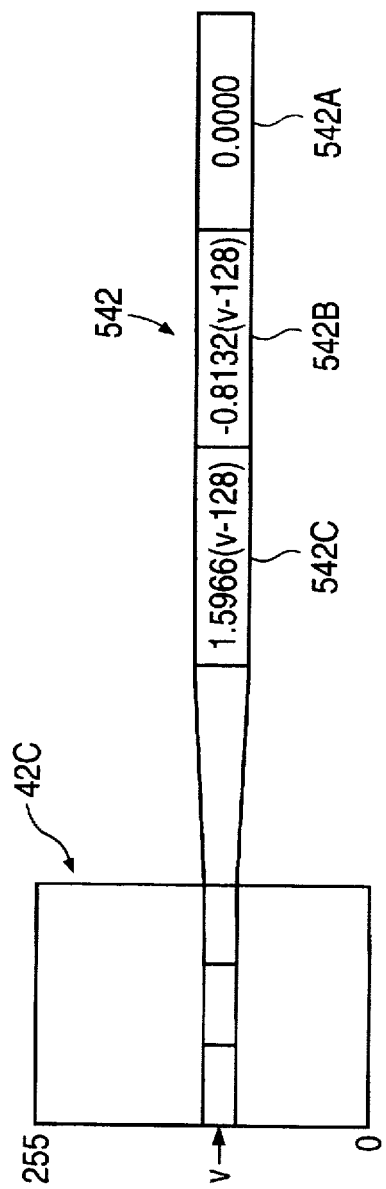

In a second embodiment of the present invention, color component words are derived by reference to a table of precalculated component words thereby obviating the partitioned multiplication operations described above with respect to FIG. 2. In this embodiment, tables 42A–C (FIGS. 5A–C) are formed within data cache 42 (described below with respect to FIG. 6). Table 42A (FIG. 5A) is a luminance table and includes 256 records each of which is 48 bits in length. Each record includes three (3) 16-bit fixed point segments corresponding to three respective color components of a luminance signal. Each record in table 42A corresponds to a specific luminance signal. For example, record 502 corresponds to a luminance signal having a value of "y" in the range of 0 to 255. Record 502 has color component segments 502C, 502B, and 502A, which in this example correspond to red, green, and blue components, respectively, of a luminance signal having a value of "y". From equation (2) above, segments 502C, 502B, and 502A each contain a 16-bit fixed point number having a value approximately equal to 1.1644(y−16). A luminance component word corresponding to a luminance signal is formed by retrieving a record from table 42A corresponding to the luminance signal.

Table 42B (FIG. 5B) is a U chrominance table and includes 256 records each of which is 48 bits in length. Each record includes three (3) 16-bit fixed point segments corresponding to three respective color components of a U chrominance signal. Each record in table 42B corresponds to a specific U chrominance signal. For example, record 522 corresponds to a U chrominance signal having a value of "u" in the range of 0 to 255. Record 522 has color component segments 522C, 522B, and 522A, which in this example correspond to red, green, and blue components, respectively, of a U chrominance signal having a value of "u". From equation (2) above, segments 522C, 522B, and 522A contain 16-bit fixed point numbers having values approximately equal to 0.0000, −0.3920(u−128), and 2.0184(u−128), respectively. A U chrominance component word corresponding to a U chrominance signal is formed by retrieving a record from table 42B corresponding to the U chrominance signal.

Table 42C (FIG. 5C) is a V chrominance table and includes 256 records each of which is 48 bits in length. Each record includes three (3) 16-bit fixed point segments corresponding to three respective color components of a V chrominance signal. Each record in table 42C corresponds to a specific V chrominance signal. For example, record 542 corresponds to a V chrominance signal having a value of "v" in the range of 0 to 255. Record 542 has color component segments 542C, 542B, and 542A, which in this example correspond to red, green, and blue components, respectively, of a V chrominance signal having a value of "v". From equation (2) above, segments 542C, 542B, and 542A contain 16-bit fixed point numbers having values approximately equal to 1.5966(v−128), −0.8132(v−128), and 0.0000, respectively. A V chrominance component word corresponding to a V chrominance signal is formed by retrieving a record from table 42C corresponding to the V chrominance signal.

Figure 4:
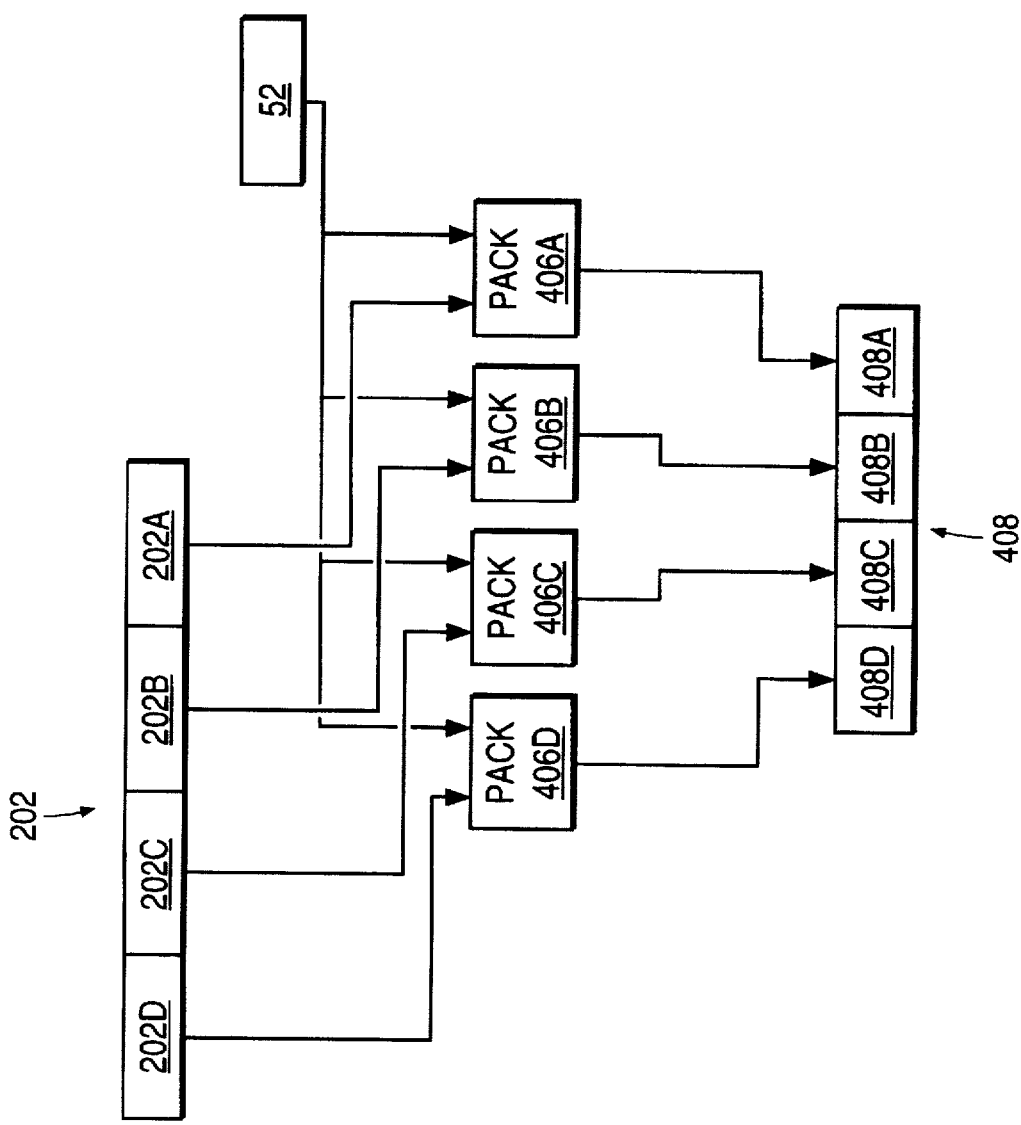
FIG. 4 is a block diagram illustrating a partitioned packing operation to scale and clip segments of the color component word formed in accordance with FIG. 3.
Figure 6:
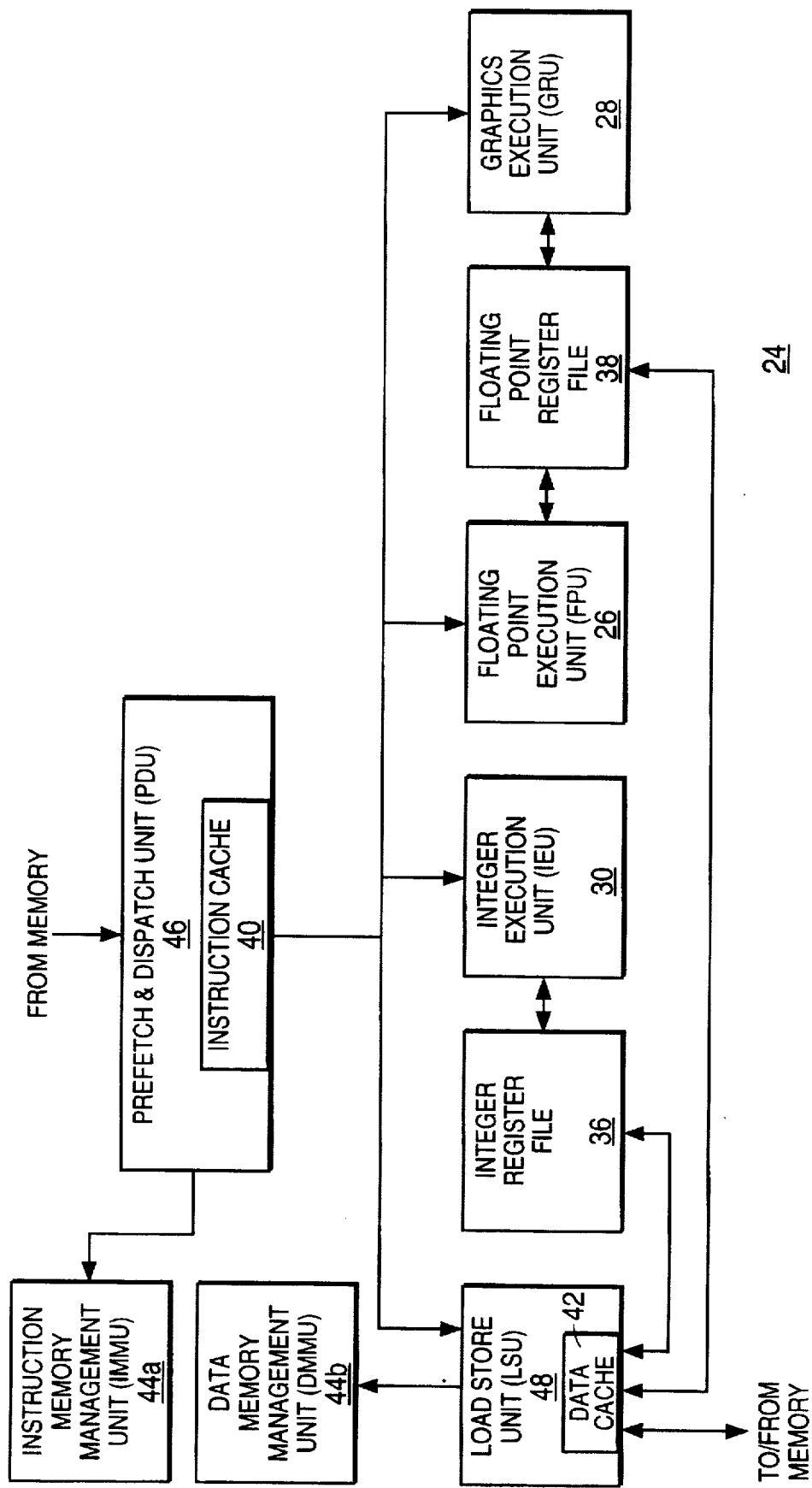
FIG. 6 is a block diagram of a central processing unit including a graphics execution unit capable of executing the partitioned multiplication and addition operations of FIGS. 2 and 3, respectively.

Once luminance, U chrominance, and V chrominance component words are retrieved from tables 42A–C (FIGS. 5A–C), a composite chrominance component word is formed from the U and V chrominance component words and a color component word is formed from the composite chrominance component word and the luminance component word as described above. In the manner described above with respect to FIG. 4, 8-bit, unsigned integers representing the color components of the pixel of the color image are derived from the color component word. The benefit of replacing the partitioned multiplication operations described above with an equal number of data retrievals from tables 42A–C is derived from the particular design of CPU 24 (FIG. 6).

CPU 24 (FIG. 6) includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, CPU 24 includes two memory management units (IMMU & DMMU) 44a–44b, and a load and store unit (LSU) 48, which in turn includes a data cache 42, coupled to each other and the previously described elements as shown. Together the components of CPU 24 fetch, dispatch, execute, and save execution results of instructions, including graphics instructions, in a pipelined manner.

PDU 46 fetches instructions from memory (not shown) and dispatches the instructions to IEU 30, FPU 26, GRU 28, and LSU 48 accordingly. Prefetched instructions are stored in instruction cache 40. IEU 30, FPU 26, and GRU 28 perform integer, floating point, and graphics operations, respectively. In general, the integer operands/results are stored in integer register file 36, whereas the floating point and graphics operands/results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point register files 36 and 38, MMUs 44a–44b, and LSU 48 can be coupled to one another in any of a number of configurations as described more completely in the '572 application.

As described more completely in the '572 application with respect to FIGS. 8a–8d thereof, GRU 28 scales and clips four (4) 16-bit fixed point segments of a 64-bit register, converting the four segments to four (4) 8-bit unsigned integer segments of a 32-bit register, in a single instruction cycle. The description of FIGS. 8a–8d of the '572 application is incorporated herein by reference.

As described above, CPU 24 includes four (4) separate processing units, i.e., LSU 48, IEU 30, FPU 26, and GRU 28. Each of these processing units is described more completely in the '572 application. These processing units operate in parallel and can each execute a respective instruction simultaneously. GRU 28 executes the partitioned multiplication, the partitioned addition, and the partitioned packing operations described above. As described in the '572 application, GRU 28 has two separate execution paths and can execute two instructions simultaneously. GRU 28 can execute a partitioned addition operation while simultaneously executing either a partitioned multiplication or a partitioned packing operation. By pipelining the various operations described above in a manner described more completely below, performance in converting pixels in YUV format to a color component format is enhanced.

GRU 28 cannot execute more than one partitioned multiplication operation or more than one partitioned addition operation at a time. By deriving luminance, U chrominance, and V chrominance component words through table lookups, which are executed by LSU 48, such component words can be derived by LSU 48 while GRU 28 simultaneously executes partitioned addition operations to form composite chrominance component words and color component words as described more completely above. By appropriately pipelining instructions to achieve such parallelism, CPU 24 is more completely used and color conversion of color images is performed more efficiently.

Table A shows, in pseudo-code format, computer instructions pipelined so as to achieve the level of parallelism in CPU 24 described above. In instruction cycle 0, LSU 48 (FIG. 6) retrieves from memory and stores in a register u32 in data cache 42 a 32-bit word in which four (4) U chrominance signals are encoded into four (4) 8-bit, unsigned integers. In a directly analogous manner, LSU 48 retrieves four (4) V chrominance signals and sixteen (16) luminance signals in instruction cycles 1–5. In instruction cycles 4–28, IEU 30 shifts 8-bit, unsigned integers into temporary registers tr0, tr1 and tr2 of data cache 42 and masks each temporary register to isolate each 8-bit, unsigned integer. As described more completely in the '572 application, IEU 30 has two execution paths and can execute two separate instructions simultaneously. Also described more completely in the '572 application is that IEU 30 and GRU 28 can together execute at most three instructions simultaneously, even though each can execute two instructions simultaneously.

In instruction cycle 6 (Table A), LSU 48 retrieves from table 42B (FIG. 5B) a U chrominance component word u0_yuv (Table A) corresponding to the U chrominance signal represented by the 8-bit, unsigned integer stored in temporary register tr0 of data cache 42 (FIG. 6). LSU 48 (FIG. 6) similarly retrieves V chrominance component word v0_yuv (Table A) from table 42C (FIG. 5C) and luminance component word y0_yuv (Table A) from table 42A (FIG. 5A) in instruction cycles 7 and 8, respectively.

In instruction cycle 9 (Table A), GRU 28 executes a partitioned addition operation to add U chrominance component word u0_yuv to V chrominance component word vo_yuv in a partitioned manner forming a composite chrominance component word c0_yuv as described above with respect to FIG. 3. In instruction cycle 10, GRU 28 executes a partitioned addition operation to add composite chrominance component word c0_yuv to luminance component word y0_yuv in a partitioned manner to replace luminance component word y0_yuv with a color component word y0_yuv. GRU 28 combines composite chrominance component word c0_yuv with luminance component word y1_yuv, z0_yuv, and z1_yuv in a directly analogous manner in instruction cycles 11, 12, and 13, respectively. In instruction cycle 14, GRU 28 scales and clips color component word y0_yuv and stores the result in a 32-bit register y0_rgb. In instruction cycle 30, LSU 48 stores the contents of register y0_rgb in memory as a pixel in RGB format. Fifteen other pixels are processed in a directly analogous manner as shown in Table A.

Since the various component words, i.e., luminance and U and V chrominance component words, are derived by retrieval from tables 42A–C (FIGS. 5A–C), LSU 48 derives the various component words. To derive the various component words by partitioned multiplication operations as described above would require that GRU 28 derive the various component words. Since, in the example illustrated in Table A, LSU 48 derives the various component words, GRU 28 can simultaneously combine the various component words to form composite components words and color component words and can simultaneously scale and clip the color component words as described above. The result is increased throughput through a better balance of the loads of the various processing units of CPU 24.

Once IEU 30 has completed isolating each chrominance and luminance signal as represented by an 8-bit, unsigned integer as described above, both execution paths of GRU 28 can be used. For example, in instruction cycle 28, GRU 28 simultaneously (1) adds a U chrominance component word u0_yuv to a V chrominance component word v0_yuv to form a composite chrominance component word c1_yuv and (2) scales and clips a color component word z3_yuv and stores the result in a 32-bit register z3_rgb. In instruction cycles 31–34 and 36–37 of the illustrative example of Table A, pointers are incremented by IEU 30 to point to the next sixteen pixels to be processed. Thus, in the example shown in Table A, sixteen pixels of a color image stored in 4:2:0 YUV format are converted to sixteen pixels in RGB format in thirty-eight instruction cycles, slightly greater than two (2) instruction cycles per pixel.

By using the color conversion process described above and illustrated in Table A, conversion of an image from YUV format to an different format, e.g., RGB format, is reduced from approximately 20 instruction cycles per pixel to generally less than 2.5 instruction cycles per second. To convert 10.4 million pixels per second of a color motion image stored in an MPEG format, the color conversion from YUV format to RGB format in the rendering of the color motion video image is reduced from 200 million instructions per second to generally less than 25 million instructions per second. Such is easily manageable by currently available processors, even those of unexceptional speed. Such a reduction in processing requirements has enabled full real-time rendering of MPEG-compressed, full-sized, digital NTSC motion video images using only CPU 24 and appropriately configured computer software. No additional, special-purpose hardware components were needed.

Figure 7:
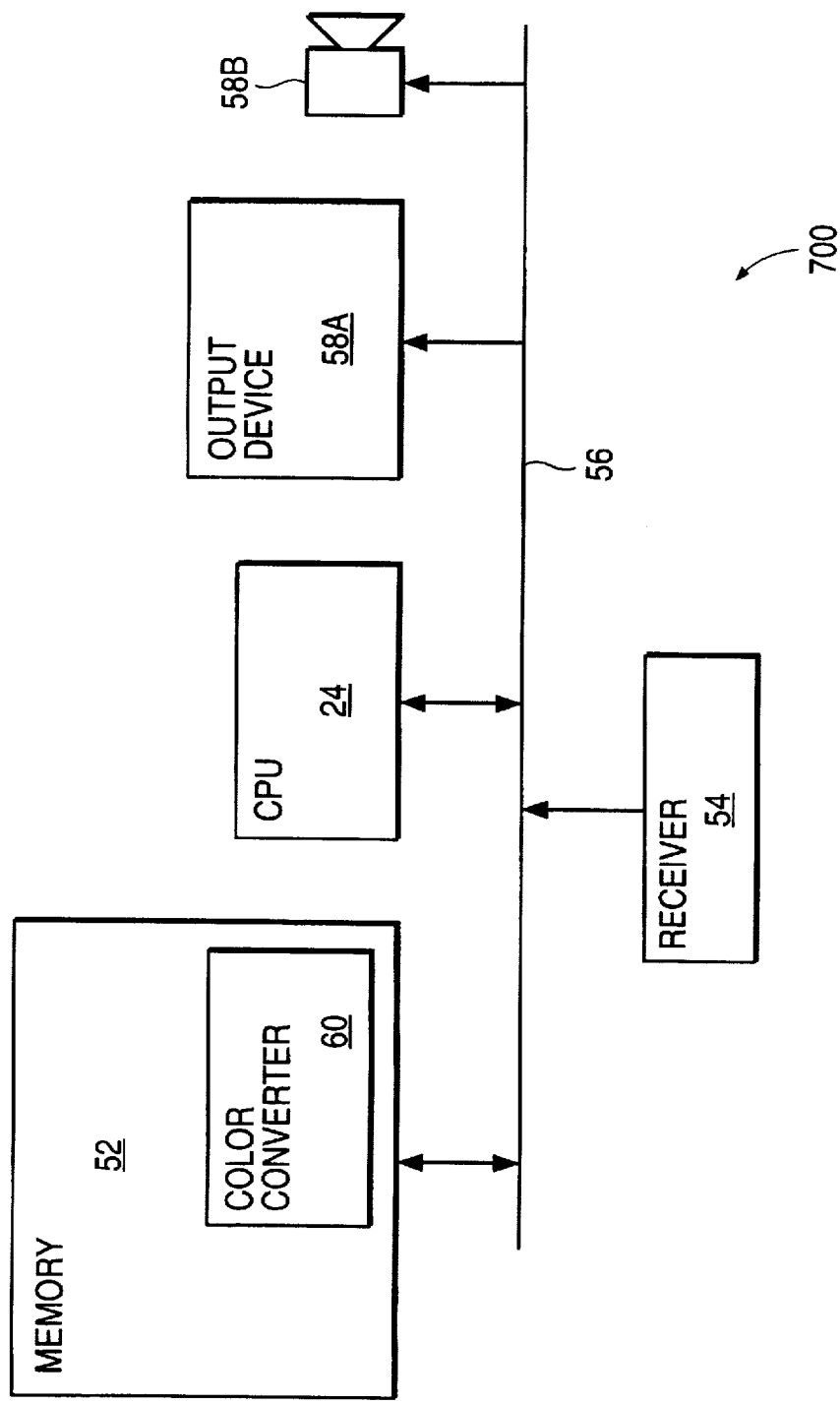
FIG. 7 is a block diagram of a computer system in accordance with the present invention and which includes the central processing unit of FIG. 6.

FIG. 7 illustrates a computer system 700 in which CPU 24 converts pixels of a color image from YUV format to the destination format generally as described. As shown in FIG. 7, CPU 24, a memory 52, a video signal receiver 54, and output devices 58A and 58B are all interconnected through a bus 56 in a conventional manner. Memory 52 can include any type of memory, including without limitation, randomly accessible memory (RAM), read-only memory (ROM), or secondary storage media such as magnetic or optically encoded discs. Receiver 54 receives luminance and chrominance signals representing the various pixels of a color video image and can include, for example, (i) a memory, like memory 52, in which such signals have been stored, (ii) a network accessing device through which such signals are received from a computer network, or (iii) an antenna or similar receiving device for receiving broadcast or otherwise transmitted video image signals. Output device 58A is a video display device capable of displaying color video images and can be, for example, a color cathode ray tube or a color liquid crystal display. Output device 58B is an audio output device and broadcasts audio signals which accompany motion video signals in some embodiments.

CPU 24 executes from memory 52 a color converter 60 which converts the particular color format of pixels from YUV format to the destination format as described above. Color converter 60 is a computer process which includes a number of computer instructions executed by CPU 24. PDU 46 (FIG. 6) of CPU 24 fetches instructions from color converter 60 (FIG. 7) in the manner described above with respect to FIG. 6 and in the '572 application and dispatches those instructions to any of LSU 48 (FIG. 6), IEU 30, FPU 26, and GRU 28.

Figure 8:
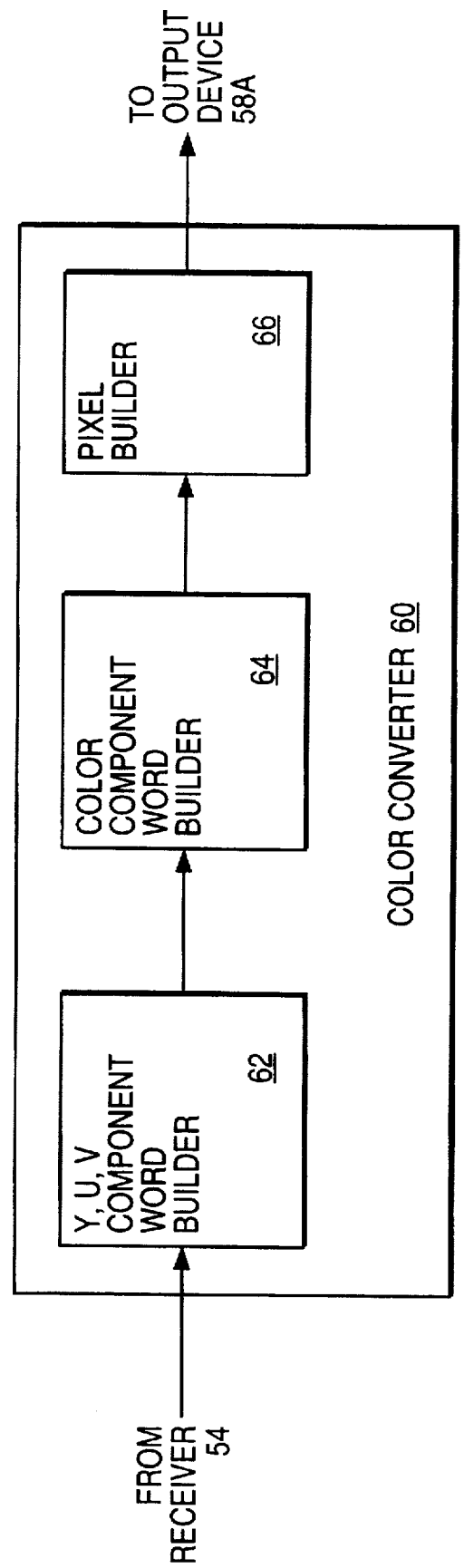
FIG. 8 is a block diagram of a color converter of the computer system of FIG. 7.

Color converter 60 (FIG. 7) is shown in greater detail in FIG. 8. Color converter 60 includes a luminance and chrominance component word builder 62, a color component word builder 64, and a pixel builder 66. Luminance and chrominance component word builder 62 receives luminance and chrominance signals from receiver 54 (FIG. 6) and builds from those signals luminance and chrominance component words in the manner described above. Color component word builder 64 generates color component words from those luminance and chrominance component words as described above in more detail through use of partitioned addition operations. Pixel builder 66 packs the color component word into a pixel format by scaling and clipping the components of the color component word as described more completely above. Pixel builder 66 also transmits generated pixels to output device 58A (FIG. 7) for display.

Thus, computer system 700 converts video signals received through receiver 54 from a YUV format to a destination format suitable for display on output device 58A in the manner described above. As described above, full real-time rendering of MPEG-compressed, full-sized, digital NTSC motion video images has been achieved with computer system 700 performing color conversion from YUV format to the destination format using only central processing unit 24 in conjunction with color converter 60.

The preceding description is illustrative only and is not limiting. Instead, the present invention is limited only by the claims which follow.

What is claimed is:

1. A method for rendering a pixel of a color image using a computer system which includes, a signal receiver, a memory, and a processing unit which in turn includes a plurality of processing sub-units, the method comprising:

(A) receiving through the receiver a luminance signal;

(B) receiving through the receiver a chrominance signal;

(C) generating a luminance component word comprising first and second color components of the luminance signal and storing the luminance component word in the memory;

(D) generating a chrominance component word comprising first and second color components of the chrominance signal and storing the chrominance component word in the memory;

(E) generating a color component word having a first color component and a second color component, the step of generating a color component word comprising the following steps performed substantially simultaneously using first and second ones, respectively, of the processing sub-units:

(i) storing as the first color component of the color component word the sum of the first color components of the luminance and chrominance component words;

(ii) storing as the second color component of the color component word the sum of the second color components of the luminance and chrominance component words; and (F) producing first and second color component signals representative of the first and second color component portions of the color component word.

2. The method of claim 1 wherein the color component word is stored in a location of the memory previously occupied by any one of the luminance and chrominance component words.

3. The method of claim 1 wherein the first and second color components of the luminance component word are calculated from the luminance signal, using the first and second processing sub-units, respectively; and further wherein the first and second color components of the chrominance component word are calculated from the first chrominance signal, using the first and second processing sub-units, respectively.

4. The method of claim 1 wherein the first and second color components of the luminance component word are determined by reference to a luminance table in the memory; and further wherein the first and second color components of the chrominance component word are determined by reference to a chrominance table in the memory.

5. The method of claim 4 wherein reference to the luminance and chrominance tables is performed by a load and store unit in the processing unit.

6. The method of claim 5 wherein the load and store unit references the luminance and chrominance tables in converting a first pixel from a first color format to a second color format while the processing sub-units perform steps (E)(i) and (E)(ii) in converting a second pixel from the first color format to the second color format.

7. The method of claim 1 wherein the step of producing first and second color component signals comprises:

packing the first and second color components of the color component word into respective first and second components of a pixel data word.

8. The method of claim 7 wherein the step of packing comprises:

scaling each of the first and second color component portions of the color component word; and clipping each of the first and second color component portions of the color component word after scaling to represent a value of at least a minimum value and at most a maximum value.

9. The method of claim 8 wherein the minimum and maximum values are zero and 255, respectively.

10. The method of claim 8 wherein the step of packing the first and second color component portions is completed in a single instruction cycle of the processing unit by first and second ones, respectively, of the processing sub-units.

11. The method of claim 7 wherein the first and second components of the pixel data word are integers.

12. The method of claim 7 wherein the first and second components of the pixel data word are 8-bit integers.

13. The method of claim 7 wherein the first and second components of the pixel data word are unsigned integers.

14. A color conversion apparatus for converting a pixel of a color image from a source format including a luminance signal and a chrominance signal to a destination format using a computer system including: (i) a processing unit which in turn includes a plurality of processing sub-units, each capable of operating in an addition mode, and (ii) a memory, operatively coupled to the processing sub-units, the apparatus comprising:

> means, responsive to the luminance signal and operatively coupled to the memory, for generating and storing in the memory a luminance component word which includes a first luminance component color portion operatively coupled to a first of the processing sub-units and representative of a first component of the luminance signal corresponding to a first component color and a second luminance component color portion operatively coupled to a second of the processing sub-units and representative of a second component of the luminance signal corresponding to a second component color;
>
> means, responsive to the chrominance signal and operatively coupled to the processing unit, for generating and storing in the memory a chrominance component word which includes a first chrominance component color portion operatively coupled to the first processing sub-unit and representative of a first component of the chrominance signal corresponding to the first component color and a second chrominance component color portion operatively coupled to the second processing sub-unit and representative of a second component of the chrominance signal corresponding to the second component color;
>
> storage means for storing in the memory a color component word comprising a first component color portion operatively coupled to the first processing sub-unit and a second component color portion operatively coupled to the second processing sub-unit;
>
> wherein operation of the processing sub-units in the addition mode (i) accumulates, in the first processing sub-unit, the first luminance component color portion of the luminance component word and the first chrominance component color portion of the chrominance component word into the first component color portion of the color component word and (ii) accumulates, in the second processing sub-unit, the second luminance component color portion of the luminance component word and the second chrominance component color portion of the chrominance component word into the second component color portion of the color component word.

15. The apparatus of claim 14 wherein the color component word is stored in a location of the memory previously occupied by any one of the luminance and chrominance component words.

16. The apparatus of claim 14 wherein the processing sub-units are operable in a multiplication mode;

further wherein the first and second component color portions of the luminance component word are calculated from the luminance signal, using the first and second processing sub-units, respectively, in the multiplication mode; and further wherein the first and second component color portions of the chrominance signal are calculated from the first chrominance signal, using the first and second processing sub-units, respectively, in the multiplication mode.

17. The apparatus of claim 14 further comprising a luminance table in the memory and a chrominance table in the memory;

> wherein the first and second component color portions of the luminance component word are determined by reference to the luminance table; and
>
> further wherein the first and second component color portions of the chrominance component word are determined by reference to the chrominance table.

18. The apparatus of claim 17 wherein the computer system further comprises a load and store unit capable of retrieving the luminance component word from the luminance table and of retrieving the chrominance component word from the chrominance table.

19. The apparatus of claim 18 wherein the load and store unit can reference either the luminance table or the chrominance table in converting a first pixel from a first color format to a second color format while the processing sub-units accumulate a luminance component word and a chrominance component word corresponding to a second pixel in converting the second pixel from the first color format to the second color format.

20. The apparatus of claim 14 further comprising:

> pixel data production means, responsive to the color component word, for producing a pixel data word, which comprises first and second component color portions;
>
> wherein the first and second processing sub-units operate in a packing mode to pack the first and second component color portions of the color component word into the first and second component color portions of the pixel data word.

21. The apparatus of claim 20 wherein the first and second component color portions of the pixel data word are each integers.

22. The apparatus of claim 20 wherein the first and second component color portions of the pixel data word are each 8-bit integers.

23. The apparatus of claim 20 wherein the first and second component color portions of the pixel data word are each unsigned integers.

24. The apparatus of claim 20 wherein, in the packing mode, the first and second processing sub-units (i) scale the first and second component color portions, respectively, of the color component word and (ii) clip the first and second component color portions, respectively, of the color component word to represent a value of at least a minimum value and at most a maximum value.

25. The apparatus of claim 24 wherein the minimum and maximum values are zero and 255, respectively.

26. The apparatus of claim 24 wherein the first and second processing sub-units scale and clip in a single instruction cycle of the processing unit.

27. The apparatus of claim 14 further comprising:

> a video signal receiver, operatively coupled to the means for generating the luminance component word and the means for generating the chrominance component word; and an output device, operatively coupled to the first and second processing sub-units;

wherein the video signal receiver is capable of receiving the luminance and chrominance signals and capable of supplying the luminance and chrominance signals to the means for generating the luminance component word and the means for generating the chrominance component word, respectively; and further wherein the output device is capable of displaying a video image pixel represented by the color component word.

28. A color conversion apparatus for converting a pixel of a color image from a source format including a luminance signal and a chrominance signal to a destination format using a computer system including a plurality of processing sub-units, each capable of operating in an addition mode, and a memory, operatively coupled to the processing sub-units, the apparatus comprising:

(a) a luminance and chrominance component word builder, responsive to the luminance signal and the chrominance signal and operatively coupled to the memory, for generating and storing in the memory (i) a luminance component word which includes a first luminance component color portion representative of a first component of the luminance signal corresponding to a first component color and a second luminance component color portion representative of a second component of the luminance signal corresponding to a second component color; and (ii) a chrominance component word which includes a first chrominance component color portion representative of a first component of the chrominance signal corresponding to the first component color and a second chrominance component color portion representative of a second component of the chrominance signal corresponding to the second component color;

(b) a color component word builder, which is operatively coupled to the luminance and chrominance word builder and which generates a color component word comprising a first component color portion operatively coupled to the first processing sub-unit and a second component color portion, the color component word builder comprising:

(i) the first processing sub-unit configured to generate the first component color portion of the color component word by summing the first luminance component color portion of the luminance component word and the first chrominance component color portion of the chrominance component word into the first component color portion of the color component word; and (ii) the second processing sub-unit configured to generate the second component color portion of the color component word by summing the second luminance component color portion of the luminance component word and the second chrominance component color portion of the chrominance component word into the second component color portion of the color component word.

29. The apparatus of claim 28 further comprising:

a video signal receiver, operatively coupled to the luminance and chrominance component word builder; and an output device, operatively coupled to the color component word builder;

wherein the video signal receiver is capable of receiving the luminance and chrominance signals and supplying the luminance and chrominance signals to the luminance and chrominance component word builder; and further wherein the output device is capable of displaying a video image pixel represented by the color component word.

30. The apparatus of claim 28 further comprising:

a pixel builder which is operatively coupled to the color component word builder and which packs the first and second component color portions of the color component word into first and second component color portions, respectively, of a pixel data word.

31. The apparatus of claim 30 wherein the first and second component color portions of the pixel data word are each integers.

32. The apparatus of claim 30 wherein the first and second component color portions of the pixel data word are each 8-bit integers.

33. The apparatus of claim 30 wherein the first and second component color portions of the pixel data word are each unsigned integers.

34. The apparatus of claim 30 wherein, in the packing mode, the first and second processing sub-units (i) scale the first and second component color portions, respectively, of the color component word and (ii) clip the first and second component color portions, respectively, of the color component word to represent a value of at least a minimum value and at most a maximum value.

35. The apparatus of claim 34 wherein the minimum and maximum values are zero and 255, respectively.

36. A method for converting a pixel of a color image stored in YUV format in a memory of a computer to a pixel in a component color format in the memory, the method comprising:

(A) storing a $U_1$ value corresponding to a first component color of the U chrominance of the pixel in a first portion of a first data word;

(B) storing a $U_2$ value corresponding to a second component color of the U chrominance of the pixel in a second portion of the first data word;

(C) storing a $U_3$ value corresponding to a third component color of the U chrominance of the pixel in a third portion of the first data word;

(D) storing a $V_1$ value corresponding to a first component color of the V chrominance of the pixel in a first portion of a second data word;

(E) storing a $V_2$ value corresponding to a second component color of the V chrominance of the pixel in a second portion of the second data word;

(F) storing a $V_3$ value corresponding to a third component color of the V chrominance of the pixel in a third portion of the second data word;

(G) storing a $Y_1$ value corresponding to a first component color of the luminance of the pixel in a first portion of a third data word;

(H) storing a $Y_2$ value corresponding to a second component color of the luminance of the pixel in a second portion of the third data word;

(i) storing a $Y_3$ value corresponding to a third component color of the luminance of the pixel in a third portion of the third data word; and (J) accumulating into a fourth data word, parallel sums of the first, second, and third portions of each of the first, second, and third data words such that:

(i) a first portion of the fourth data word contains data having a value equal to the sum of the values of the data in the first portions of the first, second, and third data words;

(ii) a second portion of the fourth data word contains data having a value equal to the sum of the values of the data in the second portions of the first, second, and third data words; and (iii) a third portion of the fourth data word contains data having a value equal to the sum of the values of the data in the third portions of the first, second, and third data words.

37. The method of claim 36 wherein the fourth data word is any one of the first, second, and third data words.

38. A method for rendering a pixel of a color image using a computer system which includes a signal receiver, a memory, and a processing unit which in turn includes a plurality of processing sub-units, the method comprising:

(A) receiving through the receiver a luminance signal;

(B) receiving through the receiver a chrominance signal;

(C) generating a luminance component word comprising first and second color components of the luminance signal and storing the luminance component word in the memory;

(D) generating a chrominance component word comprising first and second color components of the chrominance signal and storing the chrominance component word in the memory;

(E) receiving a second chrominance signal, which is different from the first-mentioned chrominance signal;

(F) generating a second chrominance component word, which is different from the first-mentioned chrominance component word and which comprises first and second color components of the second chrominance signal;

(G) generating a color component word having a first color component and a second color component, the step of generating a color component word comprising the following steps performed substantially simultaneously using first and second ones, respectively, of the processing sub-units:

(i) storing as first color component of the color component word the sum of the first color components of the luminance, the chrominance, and the second color chrominance component words; and (ii) storing as the second color component of the color component word the sum of the second color components of the luminance, the first chrominance, and the second chrominance component words; and (H) producing first and second color component signals representative of the first and second color component portions of the color component word.

39. The method of claim 38 wherein step (G) further comprises:

generating a composite chrominance component word, the step of generating a composite chrominance component word comprising the following steps performed in parallel using the first and second processing sub-units, respectively:

(i) storing in a first color component of the composite chrominance component word the sum of the first color components of the first chrominance and second chrominance component words; and (ii) storing in a second color component of the composite chrominance component word the sum of the second color components of the first chrominance and second chrominance component words.

40. A method for rendering a pixel of a color image using a computer system which includes a signal receiver, a memory, and a processing unit which in turn includes a plurality of processing sub-units, the method comprising:

(A) receiving through the receiver a luminance signal;

(B) receiving through the receiver a chrominance signal;

(C) generating a luminance component word comprising first, second, and third color components of the luminance signal and storing the luminance component word in the memory;

(D) generating a chrominance component word comprising first, second, and third color components of the chrominance signal and storing the chrominance component word in the memory;

(E) generating a color component word having first, second, and third color components, the step of generating a color component word comprising the following steps performed substantially simultaneously using first, second, and third ones, respectively, of the processing sub-units:

(i) storing as the first color component of the color component word the sum of the first color components of the luminance and chrominance (ii) storing as the second color component of the color component word the sum of the second color components of the luminance and chrominance component words; and (iii) storing as the third color component of the color component word the sum of the third color components of the luminance and chrominance component words; and (F) producing first, second, and third color component signals representative of the first, second, and third color component portions of the color component word.

41. The method of claim 40 wherein the first, second, and third color components of the color component word are red, green, and blue components, respectively.

42. The method of claim 40 wherein the first, second, and third color components of the color component word are cyan, yellow, and magenta components, respectively.

* * * * *